M. F. MIEVILLE.
APPARATUS FOR THE PRODUCTION OF CARBURETED AIR.
APPLICATION FILED DEC. 20, 1907.
947,717.
Patented Jan. 25, 1910.
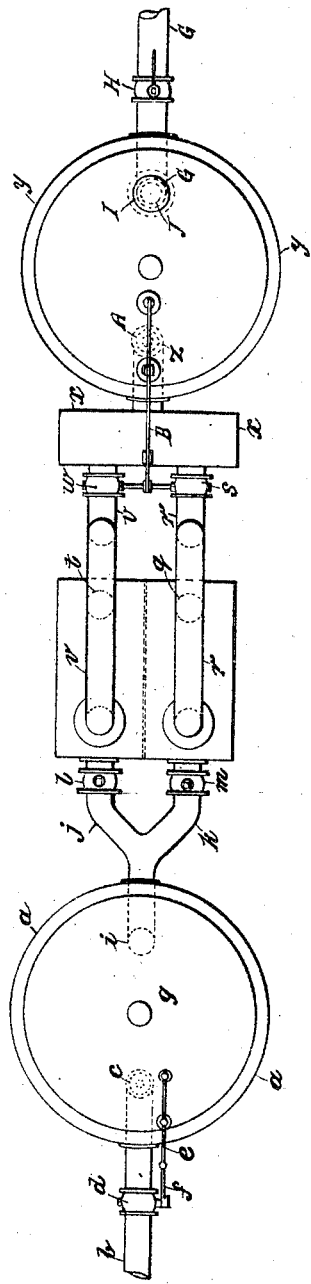
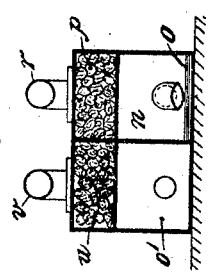
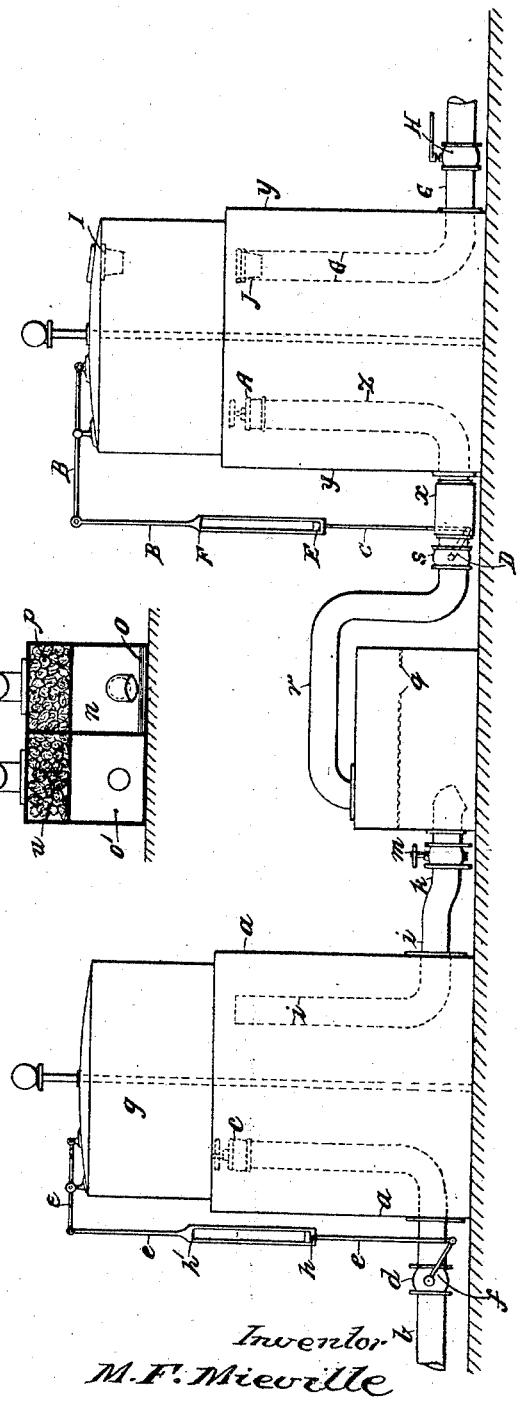
Witnesses
Inventor
M. F. Mieville

UNITED STATES PATENT OFFICE.

MORTIMER FREDERICK MIEVILLE, OF CHICHESTER, ENGLAND.

APPARATUS FOR THE PRODUCTION OF CARBURETED AIR.

947,717.            Specification of Letters Patent.     Patented Jan. 25, 1910.

Application filed December 20, 1907. Serial No. 407,409.

*To all whom it may concern:*

Be it known that I, MORTIMER FREDERICK MIEVILLE, a subject of the King of Great Britain, of Summersdale, Chichester, in the county of Sussex, England, engineer, have invented a new and useful Improvement in Apparatus for the Production of Carbureted Air, of which the following is a specification.

My invention relates to apparatus for the production of carbureted air and to that class of apparatus in which a blower is used to force the air to be carbureted through the carbureter, and it has for its object improvements by which any moisture in the air to be carbureted is effectually removed, a constant pressure of the air is maintained, the supply of the air to the carbureter is automatically controlled, and back-firing is prevented.

The accompanying drawing is an illustration of my invention, Figure 1 being a side elevation of my improved apparatus, and Fig. 2 a plan view of the same: Fig. 3 shows a sectional view of the carbureter.

$a$ is an aerometer to which air is supplied under pressure through the pipe $b$ by means of any suitable blower; $c$ is a non-return valve situated in the interior of the aerometer and preventing the return of the air from the latter. The supply of air from the blower is automatically regulated by means of the valve $d$ operated by the rods $e, e$, and lever $f$, connected to the sliding bell $g$ of the aerometer. When the aerometer is filled the supply of air is cut off, while when the sliding bell descends, as it is emptied of its contents, the supply will be again turned on, the stops $h, h'$ upon the rods $e$ being adjusted to the required positions. From the aerometer the pure air under pressure passes through the pipe $i$. As shown in Fig. 2 this pipe $i$ is divided into two branches $j$ and $k$, hand regulated valves $l, m$, regulating the supply of air at the two points shown. The air from the branch $k$ passes into the chamber $n$ (Fig. 3) and is directed down upon or through a supply of petrol $o$ maintained at a constant level by means of a float valve or other device (not shown in the drawing) in the ordinary well-known manner. The carbureted air then passes to the upper chamber by the opening $q$ and through suitable moisture absorbing material (such as chlorid of calcium) with which the chamber $p$ is supplied, and the carbureted air then passes by the pipe to the automatically operated valve $s$. A similar course of events takes place with the air passing through the branch $j$ with the exception that it is not passed through a petrol chamber and consequently is not carbureted. It passes through the chamber $o'$ and thence through the opening $t$ into and through the drying chamber $u$ and by the pipe $v$ to the automatically operated valve $w$. It will be seen that at the valves $s$ and $w$ the pipe $v$ is charged with dry air under pressure and that the pipe $r$ is charged with carbureted air under pressure.

The valves $s$ and $w$ having been first adjusted, will permit the two streams of carbureted and pure air to enter the mixing chamber $x$ in exactly the proportions desired and the mixture then passes to the gasometer $y$ through the pipe $z$ provided with a non-return valve A to be stored for use as required. The sliding bell of the gasometer $y$ operates by means of the rods B, C, the valves $s$ and $w$, by the lever D, the stops E and F being adjusted to open and close the valves when the gasometer is respectively nearly emptied or nearly filled, and the supply of carbureted air in the gasometer is consequently maintained at a constant pressure to be drawn off when required by the pipe G and cock H.

A conical or other suitable plug is shown at I, fitting, when the gasometer is sufficiently emptied of its contents, the corresponding seating J in the pipe G.

I may in some cases dry the air by passing it through suitable drying chambers of a similar nature to those already described before it passes into the carbureter and immediately after leaving the aerometer.

I do not confine myself to the exact details as described and illustrated which may be varied to suit different circumstances, the essential features of my invention being the storing of the pure air under pressure, carbureting a portion of such air which again mixes with pure air, the whole of the air before mixing having passed through separate drying chambers, and the prevention of back firing in the gasometer when the latter is emptied of its contents.

What I claim as my invention and desire to secure by Letters Patent, is:—

The combination in apparatus for the production of carbureted air, of an aerometer for storing pure air under pressure, means for automatically regulating the supply of air to said aerometer, a carbureter provided with an adjustable valve by which part of the pure air is carbureted, a drying chamber for drying said carbureted air, a separate drying chamber, through which the other part of the pure air is passed, a mixing chamber to which both streams of air are admitted, controlling valves for automatically regulating the two volumes of air admitted to the mixing chamber, a gasometer for storing the supply of mixed carbureted and pure dried air, and a discharge pipe from the gasometer having a safety stop for the prevention of back fire, all substantially as set forth.

In witness whereof I have hereunto set my hand in the presence of two witnesses.

MORTIMER FREDERICK MIEVILLE.

Witnesses:
ARTHUR E. EDWARDS,
D. K. BOYLE.